April 5, 1932.  C. C. SUNDERLAND  1,852,683
ANCHOR CONNECTION FOR BRIDGE AND OTHER CABLES
Filed Dec. 16, 1930  5 Sheets-Sheet 1
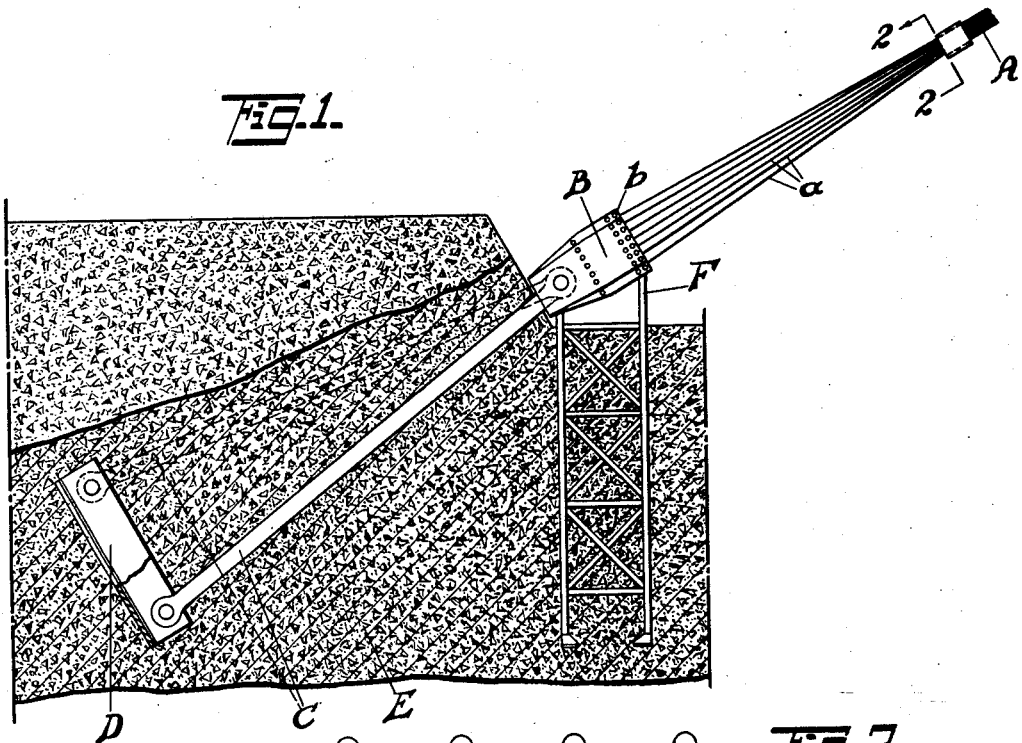
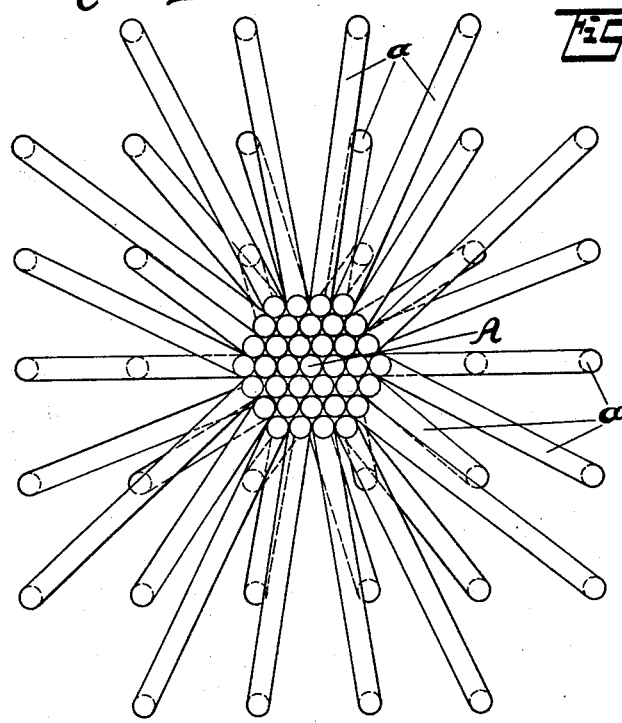
Inventor
Charles C. Sunderland
By
His Attorneys

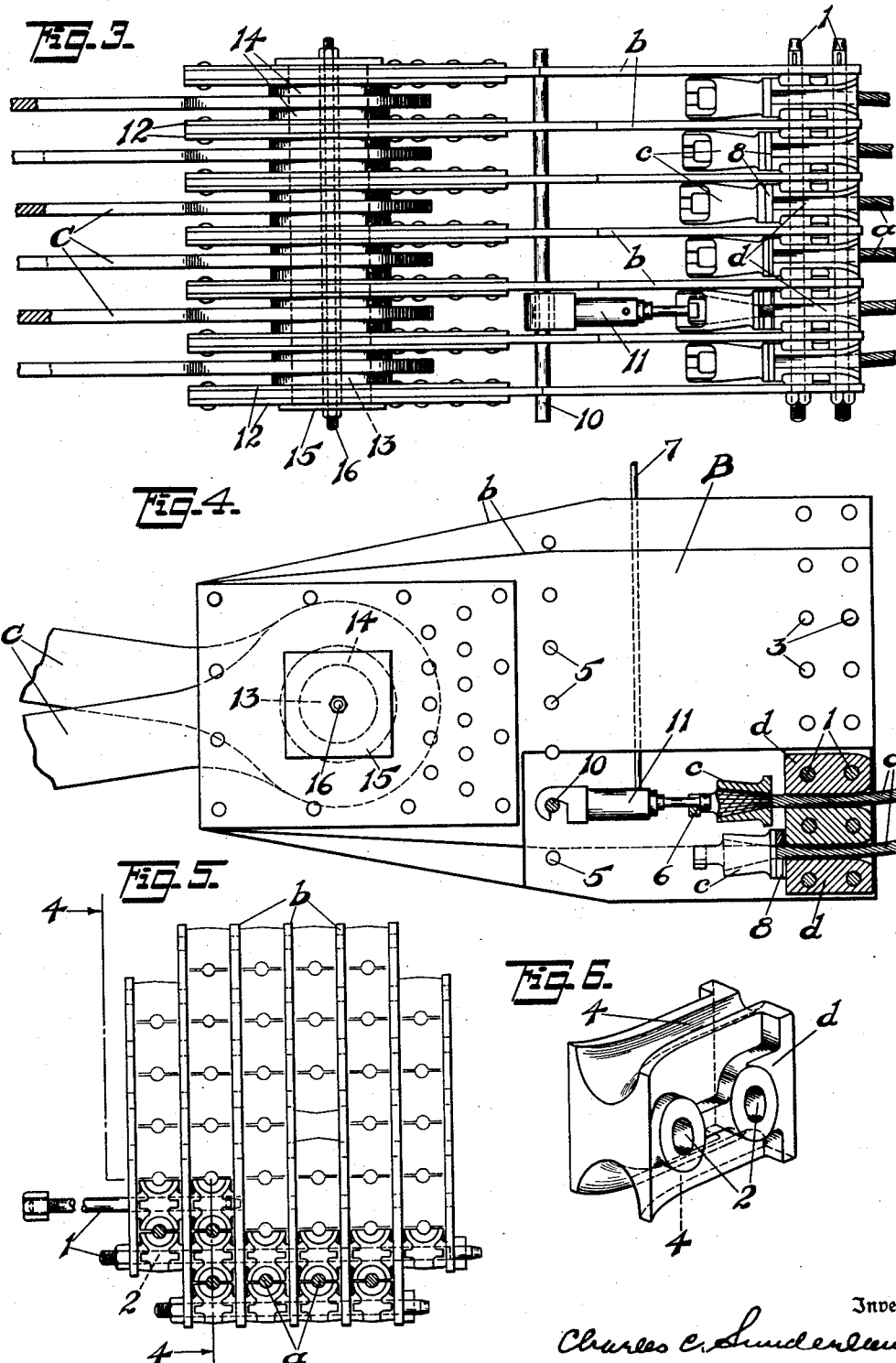

April 5, 1932. C. C. SUNDERLAND 1,852,683
ANCHOR CONNECTION FOR BRIDGE AND OTHER CABLES
Filed Dec. 16, 1930 5 Sheets-Sheet 3
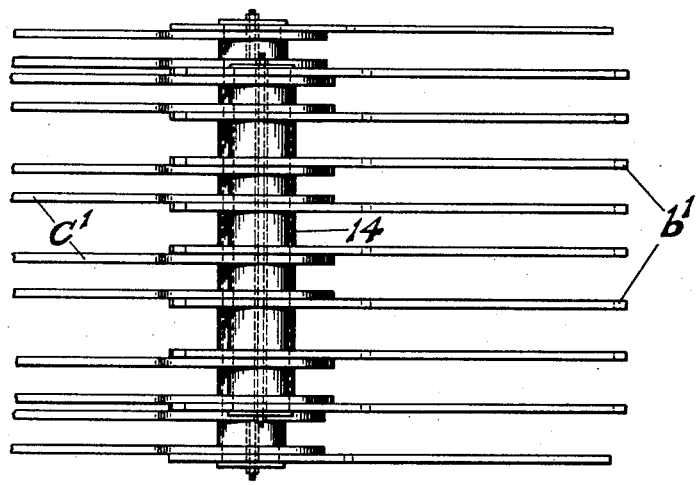
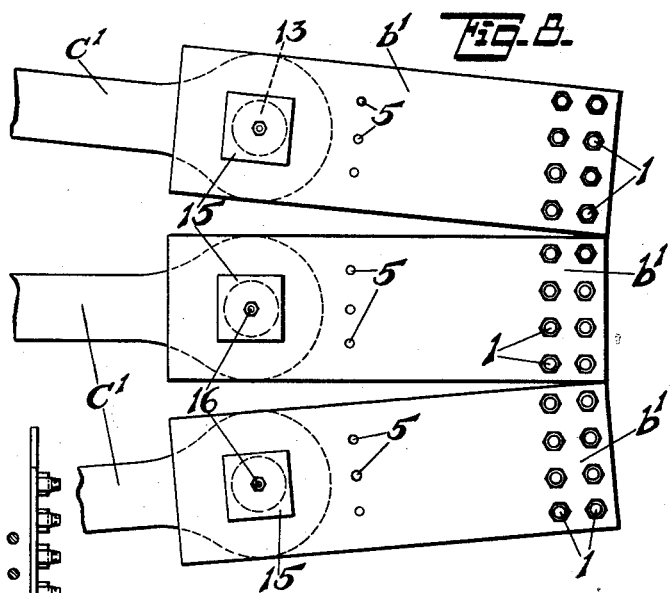
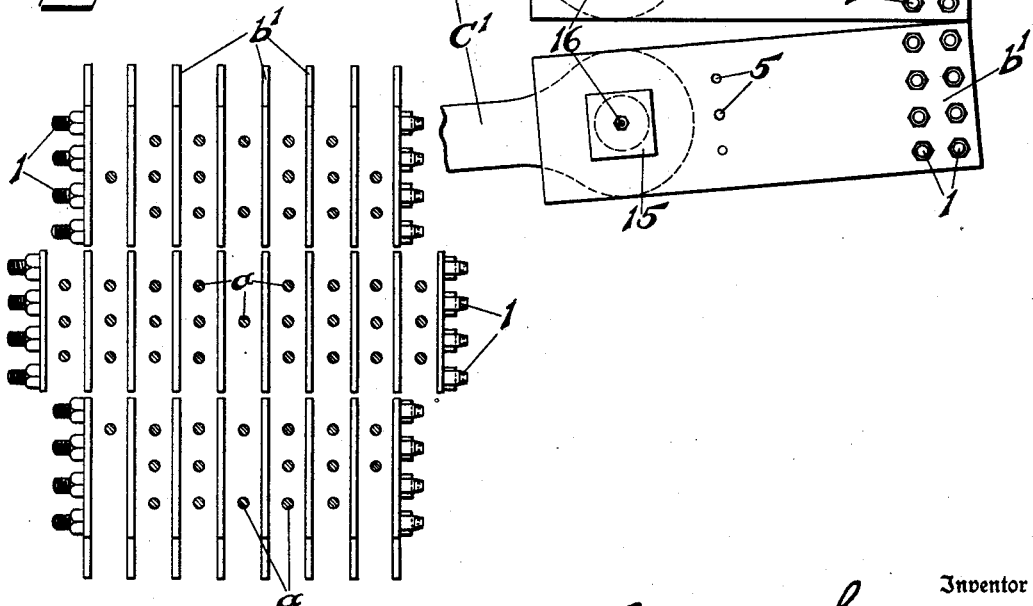

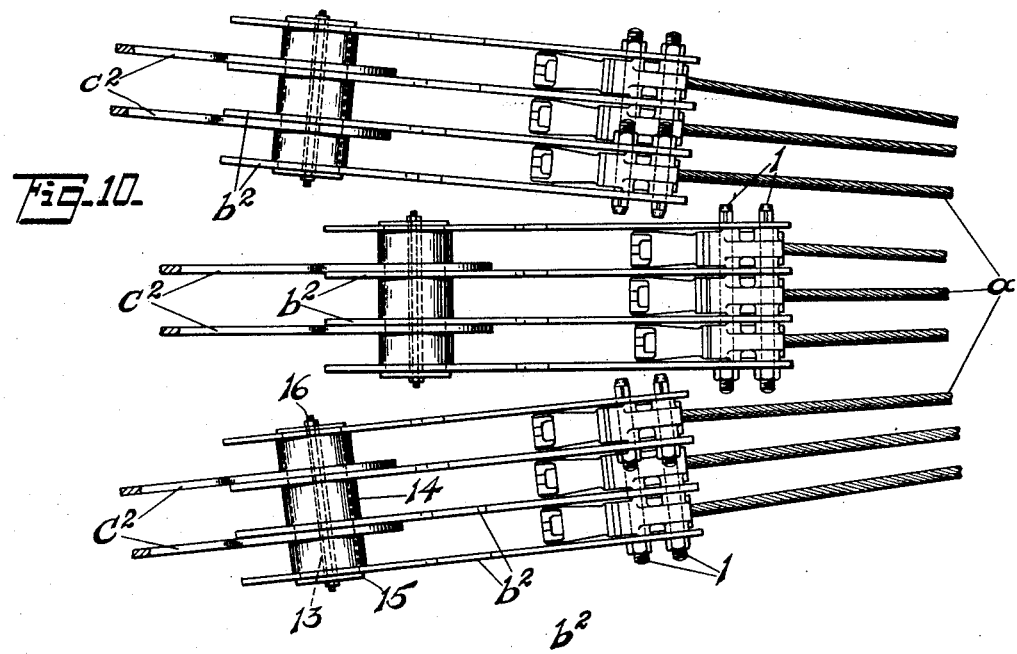
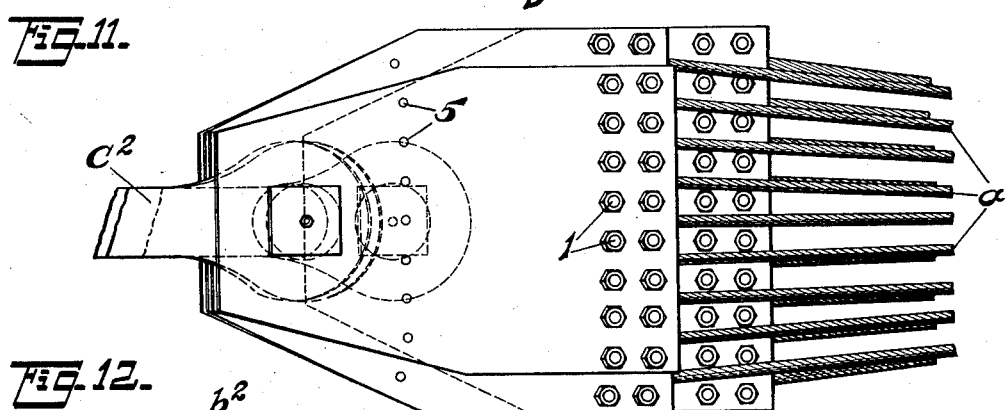
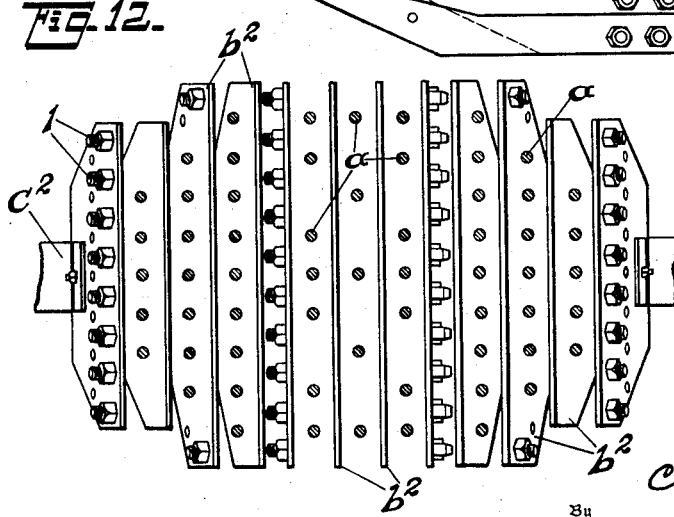

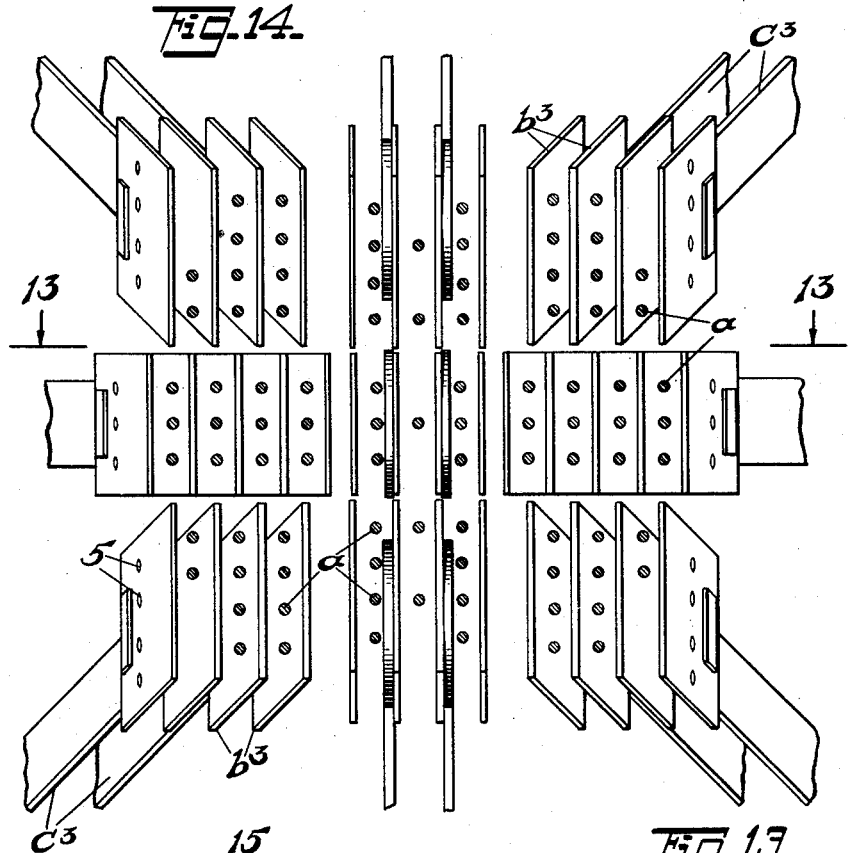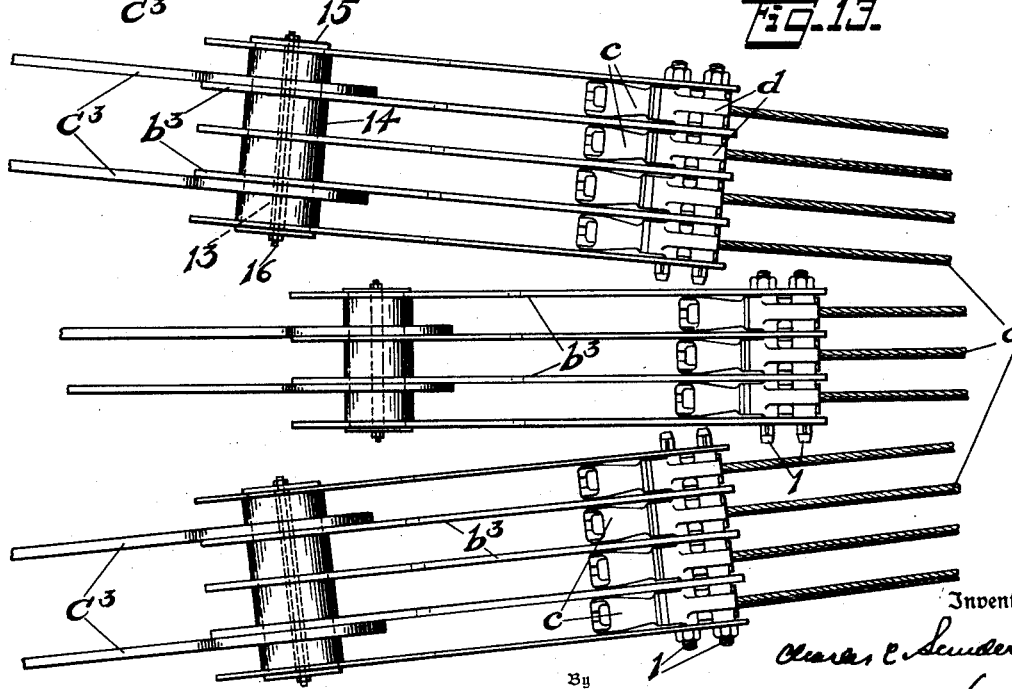

Patented Apr. 5, 1932

1,852,683

UNITED STATES PATENT OFFICE

CHARLES C. SUNDERLAND, OF NEW BRUNSWICK, NEW JERSEY, ASSIGNOR TO JOHN A. ROEBLING'S SONS COMPANY, OF TRENTON, NEW JERSEY, A CORPORATION OF NEW JERSEY

ANCHOR CONNECTION FOR BRIDGE AND OTHER CABLES

Application filed December 16, 1930. Serial No. 502,635.

This invention relates to anchor connections by which the separate strands of multiple strand cables are anchored, the especial object being to provide connections that are simple, compact and convenient of assembly, and which will reduce length of splay or angles required in the splaying of the cable strands for anchoring. The invention has been made in connection with and is especially applicable to the anchorage of the large cables of suspension bridges and the like. The invention is equally applicable to cables formed of single solid wires or of strands made up of a plurality of wires and the term "strand" will be used herein to include both.

In constructions embodying the present invention, each of the strands of the cable is provided with a bearing member at the end formed preferably by socketing the strand, and this bearing member transmits the tension of the socketed strand through bearing blocks to anchor plates which form the connection to the anchorage. The bearing members on the strand ends are formed for the connection of hydraulic or similar jacks by which the strands are adjusted in position or tension, such adjustment being maintained by shims between the sockets and bearing blocks if necessary.

For a full understanding of the invention, a detailed description of constructions embodying all the features of the same in preferred forms will now be given in connection with the accompanying drawings, forming a part of this specification and showing the invention as applied in connection with a bridge cable anchorage, and the features forming the invention will then be specifically pointed out in the claims.

In the drawings:

Figure 1 is a sectional elevation of a bridge cable anchorage embodying the invention as applied in connection with a 37-strand cable;

Figure 2 is a view on line 2 of Figure 1, looking in the direction of the arrow, and showing the position of the splayed strands;

Figure 3 is a plan view of the anchor connection;

Figure 4 is a sectional elevation of the anchor connection on the line 4 of Figure 5;

Figure 5 is a diagrammatic end view of the anchor connection looking to the left in Figures 3 and 4, some only of the bearing blocks and shear pins being shown in detail for simplicity of illustration;

Figure 6 is a perspective detail view of one of the bearing blocks;

Figures 7, 8 and 9 are diagrammatic views showing the invention applied in connection with a 61-strand cable, with the splayed strands arranged in three vertical sets, Figure 7 being a plan view, Figure 8 a side elevation, and Figure 9 an end elevation looking to the left in Figure 8, with the bearing blocks omitted;

Figures 10, 11 and 12 are diagrammatic views similar to Figures 7, 8 and 9 showing the invention applied in connection with a 61-strand cable with the strands splayed in three sets, arranged horizontally;

Figures 13 and 14 are views similar to Figures 10 and 11 with the shear pins omitted in Figure 14, and showing the invention applied in connection with a 91-strand cable with the strands splayed in nine sets arranged three sets vertically and three sets horizontally.

Referring now particularly to Figures 1 to 6, A is the cable, shown as a parallel strand cable of 37 strands $a$, B the anchor connection as a whole, $b$ the anchor plates, C, D the anchorage bars and anchorage blocks embedded in the concrete or other anchorage material E, and F an anchor connection support embedded in the anchorage. The strands $a$ of cable A are splayed with their ends in rows, shown as horizontally arranged, and each of these splayed strands $a$ carries at the end a bearing member $c$, shown as a socket in which the strand end is socketed in the usual manner, and these bearing members coact with bearing blocks $d$ mounted between the anchor plates $b$ and secured thereto by shear pins 1, passing through holes 2 in the bearing blocks $d$ and holes 3 in the anchor plates $b$, each of the shear pins passing through a row of bearing blocks. Preferably two or more pins for each row of bearing blocks will be used and arranged horizontally in line, two such pins for each bearing block being shown, thus reducing the vertical dimensions of the anchor connection as compared with a single pin of the strength required. These bearing blocks $d$ are preferably made as shown in Figure 6, each with a half strand groove 4 on its upper and lower face, preferably expanded at the front of the block to accommodate the strand angle, so that these blocks may be inserted in rows successively with the strands placed in the top half grooves and as each horizontal row of bearing blocks is inserted, the shear pins 1 will be passed through the blocks of the row and the anchor plates. With this construction the tension of each strand is supported by two rows of pins, one row in each half of the bearing block on which its socket bears.

The bearing blocks $d$ are mounted at the forward end of the anchor plates $b$, thus leaving the rear portions of these plates for the anchorage connection, and for the adjusting devices for the strands $a$. In this rear portion of the anchor plates $b$ are provided holes 5 in line with the half grooves 4 and in line through the series of plates, one hole for each row of bearing blocks, through which the temporary abutment rod 10 may be passed, serving as abutments for a hydraulic or similar jack 11 with its supply connection 7, and the jacks 11 and sockets $c$ are provided with connections 6 by which the sockets and strands may be drawn back into proper position or tension and after adjustment of a strand it may be held in its proper adjustment by shims 8 inserted between the sockets $c$ and bearing blocks $d$ and the jack removed for adjustment of another strand. In Figure 4 one of the strands and sockets is shown as having been adjusted and shimmed, and the next strand and socket as being adjusted by the jack 11, and in Figure 5, the lower row of strands and bearing blocks are in place with their shear pins 1 inserted and locked at their ends, while in the second row the pins 1 are shown as partially inserted for purpose of illustration.

The anchor plates $b$ are shown in Figures 3 and 4 as having bolted thereon at their rear ends beyond the holes 5, plates 12 for increase of bearing surface, and the connection between the anchor plates $b$ and the anchor bars C is made by a bar 13 passing through the anchor plates $b$ and plates 12, and the anchor bars C with separating sleeves 14, the parts of this assembly being held together by end washers 15 secured by bolts 16 passing through the bar 13.

The arrangement shown in Figures 1 to 6 above described, is satisfactory for cables having any number of strands up to the 37-strand cable shown, and may be used also for cables having a larger number of strands. For cables with a larger number of strands, however, it is usually preferable to arrange the anchor connections in sets, each with its own anchorage connections, rather than in a single set as shown in Figures 1 to 6.

In Figures 7, 8 and 9 an anchor connection for a 61-strand cable is illustrated, in which the construction is the same as above explained except that the anchor plates are in three sets arranged one above the other or vertically, each carrying approximately the same number of strands, each set of anchor plates $b'$ being connected to its own set of anchor bars $C'$ by the same connection as previously explained. These anchor plates $b'$ are connected to the anchor bars $C'$ in the same manner as above described. The bearing blocks are omitted in these figures, for simplicity of illustration, but it will be understood that the form and arrangement of these bearing blocks and their connection with the anchor plates by the shear pins 1 is the same as shown in Figures 1 to 6.

In Figures 10 to 12, there is shown an anchor connection for a 61-strand cable with the anchor plates in three sets, arranged side by side or horizontally, the arrangement and connection of the anchor plates $b^2$ to the anchor bars $C^2$ being otherwise the same as above described.

In Figures 13 and 14 an anchor connection for a 91-strand cable is shown, the anchor plates being arranged in nine sets, three sets vertically and three sets horizontally, each set of anchor plates $b^3$ being connected to their corresponding anchor bars $C^3$ by the same connection, and the construction otherwise being the same, as previously described.

It will be seen that in each of the arrangements shown, the horizontal and vertical splay of the strands from the cable is about the same, and that the arrangement of the anchor plates and bearing blocks transmitting the strand tension results in small vertical and horizontal dimensions of the anchor connection and corresponding reduced length and angle of the splay of the strands. This result is also aided by the connection of the bearing blocks and anchor plates by a plurality of horizontally arranged pins, which reduces the vertical dimensions of the anchor connection. The construction, also, is very simple and convenient of assembly, and the proper position or tension of the strands readily secured and the adjustment efficiently maintained by the sockets or bearing pieces carried by the strands and coacting with the bearing blocks through which the strand tension is transmitted to the anchor plates. The connection of the strands to the forward end of the anchor plates leaves the rear end of the anchor plates free for direct connection to the anchor bars or other anchorage, and provides for an abutment on the plates rearward of the strand ends for a jack or other adjusting device.

While my improved anchor connection has been illustrated in connection with a bridge cable anchorage and it is especially valuable in such connection, the same system of anchor plates and associated parts may be used in other connections, in which it is necessary to splay and anchor or otherwise connect the strands of a multiple strand cable. Thus in cases in which a very large track cable is used and it is desired to anchor this rope to a set of smaller diameter ropes, as, for instance, in order that small diameter sheaves may be used, this anchor connection is well adapted for such purpose, and uniform tension in the smaller diameter ropes may readily be secured by the use of a hydraulic jack, with a pressure gage to determine the position in which the desired tension is reached. In a long span suspension bridge with steep back-stays, also, this anchor connection may be used for connecting the back-stays to the main cables terminating at the tower top, it being thus possible to make the main cables of just the right size for the cable requirements, resulting in a large economy.

It will be understood that the invention is not limited to the exact construction or arrangement of parts shown, but that many modifications may be made therein by those skilled in the art within the invention claimed.

What is claimed is:

1. An anchor connection for multiple strand cables, having a series of anchor plates, bearing blocks between the forward portions of said anchor plates, bearing members carried by the strands and bearing against said blocks, and pins passing through the bearing blocks and anchor plates for transmitting the strand tension to the anchor plates.

2. An anchor connection for multiple strand cables, having a series of anchor plates, bearing blocks between the forward portions of said anchor plates, and arranged in rows transversely to the plates, said bearing blocks being arranged in a group of substantially equal vertical and horizontal dimensions, bearing members carried by the strands and bearing against said blocks, and pins passing through each row of bearing blocks and the anchor plates for transmitting the strand tension to the anchor plates.

3. An anchor connection for multiple strand cables, having a series of anchor plates, bearing blocks between the forward portions of said anchor plates and arranged in rows transversely to the plates, bearing members carried by the strands and bearing against said blocks, and a plurality of pins coacting with each row of bearing blocks and passing through the bearing blocks and anchor plates for transmitting the strand tension to the anchor plates, said plurality of pins being arranged in line longitudinally of the plates.

4. An anchor connection for multiple strand cables, having a series of anchor plates set edgewise vertically and parallel with each other, bearing blocks between the forward portions of said anchor plates arranged in series of horizontal rows, transversely to the plates, bearing members carried by the strands and bearing against said blocks, and pins passing through each row of bearing blocks and the anchor plates for transmitting the strand tension to the anchor plates.

5. An anchor connection for multiple strand cables, having a series of anchor plates, bearing blocks between the forward portions of said anchor plates, bearing members carried by the strands and bearing against said blocks, pins passing through each row of bearing blocks and the anchor plates for transmitting the strand tension to the anchor plates, and an anchorage connection from the rear portion of said anchor plates.

6. An anchor connection for multiple strand cables, having a series of anchor plates, bearing blocks between the forward portions of said anchor plates, bearing members carried by the strands and bearing against said blocks, pins passing through the bearing blocks and the anchor plates for transmitting the strand tension to the anchor plates, and an anchorage connection from the rear portion of said anchor plates, said anchor plates being of such length as to provide for an adjusting jack between the bearing blocks and the rear connection.

7. An anchor connection for multiple strand cables, having a plurality of groups of anchor plates, each group being arranged for connection to a portion of the cable strands and having its own anchorage or other connection, bearing blocks between and secured to the anchor plates, and bearing members carried by the strands and coacting with the bearing blocks.

8. An anchor connection for multiple strand cables having a plurality of groups of anchor plates, each group being arranged for connection to a portion of the cable strands and having its own anchorage or other connection, bearing blocks between and secured to the anchor plates, and bearing members carried by the strands and coacting with the bearing blocks, said groups of anchor plates being arranged to provide for approximately equal vertical and horizontal dimensions of the anchor connection to reduce the splay of the cable strands.

9. An anchor connection for multiple strand cables, having a series of anchor plates, bearing blocks having strand half grooves in opposite faces between said plates, bearing members secured on the ends of the cable strands and bearing against the bearing blocks, and pins passing through the bearing blocks and anchor plates.

10. An anchor connection for multiple strand cables, having a series of anchor plates, bearing blocks at their forward ends having half grooves in opposite faces between said plates, bearing members secured on the ends of the cable strands and bearing against the bearing blocks, and pins passing through the bearing blocks and anchor plates, said bearing members being formed for the attachment of an adjusting jack and said anchor plates being of such length as to provide for a jack abutment and anchorage connection in their rear portions.

In testimony whereof, I have hereunto set my hand.

CHARLES C. SUNDERLAND.